Jan. 19, 1926.  
A. DAMORE  
1,570,464  
SAFETY DEVICE FOR AUTOMOBILES  
Filed Feb. 13, 1923  2 Sheets-Sheet 2
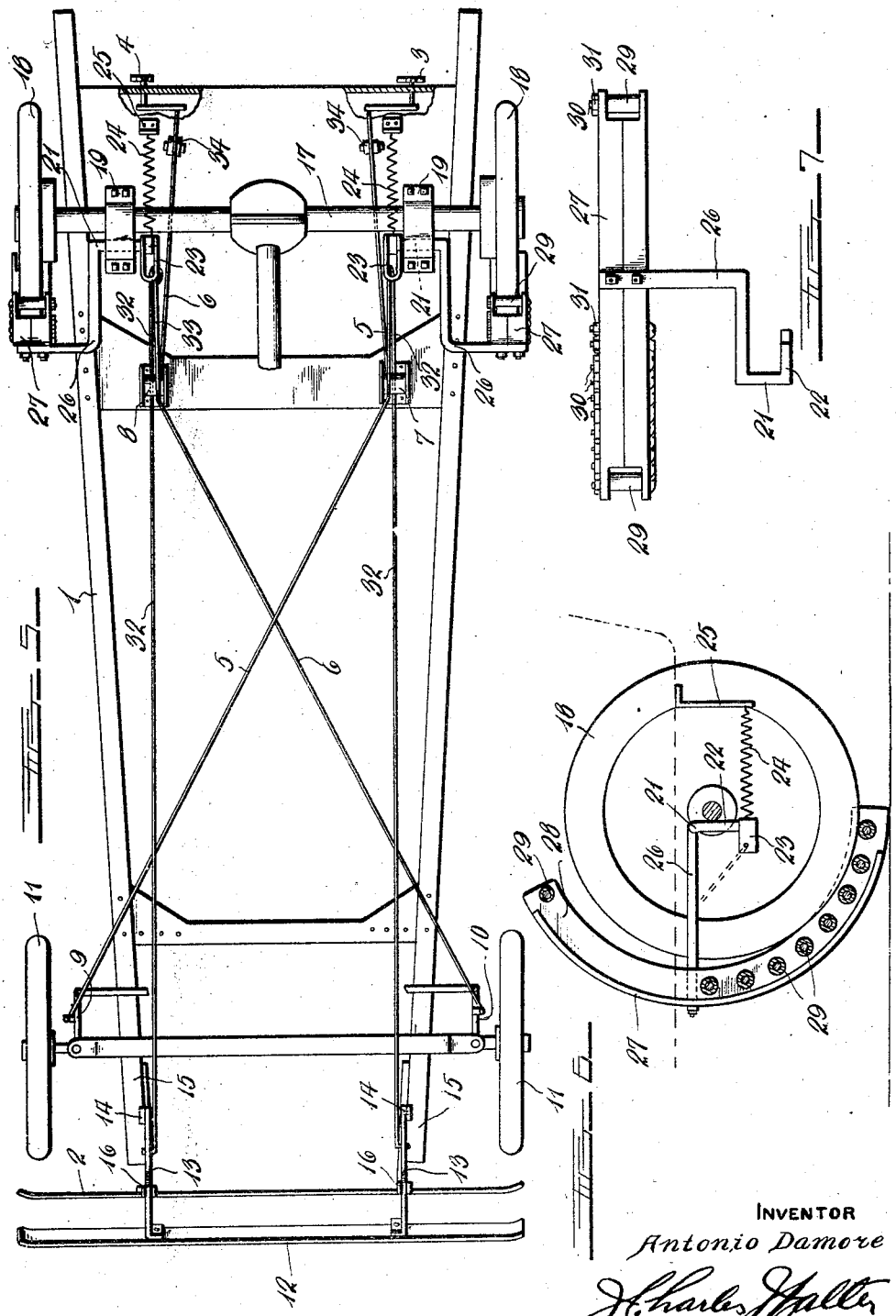
INVENTOR  
Antonio Damore  
By  
ATTORNEY Patented Jan. 19, 1926.

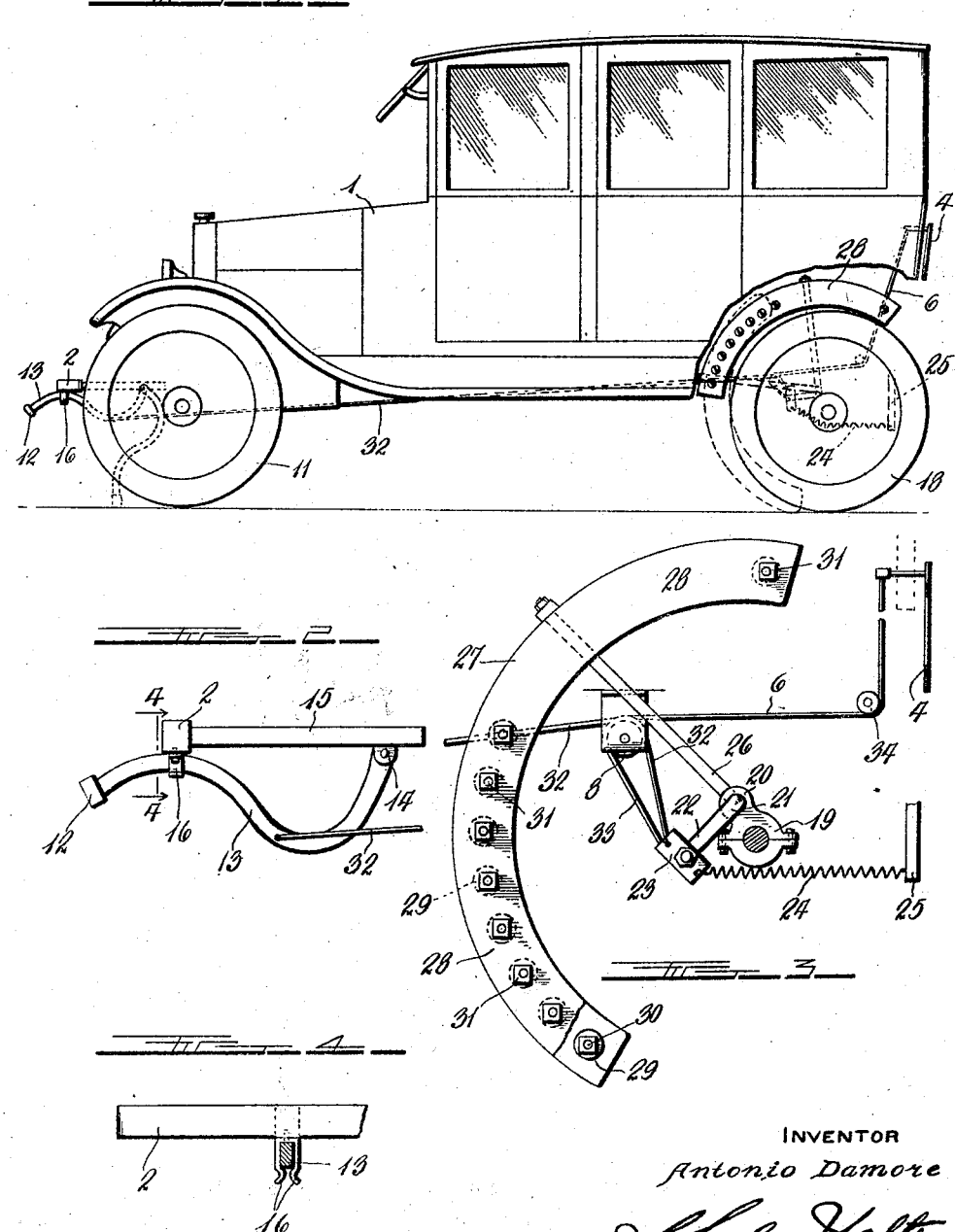

1,570,464

UNITED STATES PATENT OFFICE.

ANTONIO DAMORE, OF BROOKLYN, NEW YORK.

SAFETY DEVICE FOR AUTOMOBILES.

Application filed February 13, 1923. Serial No. 618,875.

*To all whom it may concern:*

Be it known that I, ANTONIO DAMORE, a citizen of the United States, residing at Brooklyn, in the county of Kings and State of New York, have invented certain new and useful Improvements in a Safety Device for Automobiles, of which the following is a specification.

My invention relates to safety apparatus for use on automobiles. The primary object is the provision of bumper actuated, automatic mechanism for immediate stopping of an automobile on forcible contact of a bumper with an object in front of the machine.

A further object is to provide a mechanism of this character in which, upon stoppage of the vehicle, the rear wheels thereof are jacked up to run free and a visual stop signal displayed at the rear of the machine, simultaneously with the lowering, at the front, of a fender bumper.

Another object is the provision of a contact operated release for accomplishing the objects set forth.

A still further object is the provision of mechanism as described, which is supplemental to, and coactive with, the usual bumper, and direction indicating mechanism with which a machine may be equipped.

With these general objects in view, and such others as will be apparent from the description, my invention resides in the novel construction, combination, and arrangement of parts hereinafter described and claimed, and illustrated in the accompanying drawings, of which Figure 1 is a side elevation of an automobile equipped with the invention, Figure 2 a detail elevation of the release mechanism, Figure 3 a detail elevation of the jacking, and signal operating mechanism, Figure 4 a detail of the contact release, Figure 5 a bottom plan view of a chassis equipped as in Figure 1, Figure 6 an elevation of the jacking mechanism in operative position, and Figure 7 an elevation of the jack member.

The invention is shown as applied to an automobile 1, having the usual forward bumper 2 and rearwardly disposed right and left direction indicating arms 3 and 4 respectively, controlled by cables 5 and 6 which pass respectively, over pulleys 7 and 8 mounted beneath the vehicle body, which cables are respectively connected to the steering knuckles 9 and 10. Depending on the direction in which the front wheels 11 are turned, either signal arm 3 or 4 will be projected laterally of the rear of the machine.

At the front of the machine and forwardly of the bumper 2, is a supplemental fender bumper 12 disposed slightly below the bumper 2 and carried by a pair of substantially S shaped arms or bars 13 pivoted at their inner ends to brackets 14 carried by the side bars 15 of the vehicle frame. The fender 12 is supported in normally raised position by means of spring tension clips 16 on the bumper 2, which engage over the bars 13, holding the fender in raised position in such manner that a slight shock will release it.

Owing to the substantially S-shaped configuration of the bars 13, the fender 12 will be disposed at a downward slant, so that on contact with an obstacle, the force exerted will be rearwardly and down, to disengage the bars 13 from the clips 16 and drop the fender.

At the rear of the machine is disposed the mechanism for automatically jacking up the rear wheels on lowering of the fender 12. The rear axle housing 17 carries adjacent each wheel 18, a split collar 19, rigidly secured thereon and provided with an upstanding eye 20 in which is journalled the intermediate or shaft portion 21 of a bell crank lever. The eyes 20 are offset and the short arm 22 of each lever carries at its lower end a clevis 23 to which is attached one end of a contracting spring 24, the other end thereof being connected to a depending bracket 25 at the rear of the machine. The arm 22 extends below the rear axle and spring 24 is also disposed beneath the axle.

The long arm 26 of each lever extends radially from the rear axle housing a sufficient distance to clear the periphery of the adjacent rear wheel, and has a lateral extension projecting over the wheel. Rigidly secured on the outer end of this extension, is a two piece trough shaped sector 27, between the walls 28 of which are journalled a plurality of spaced rollers 29 grouped adjacent the lower end of the sector. These rollers are journalled over bolt stems 30 secured in position by the nuts 31, for ready removal and replacement as desired.

Connected to each fender carrying arm 13 at substantially the lowermost portion of the bend therein, is a cable 32 extending rearwardly over the respective pulleys 7 and 8 and connected to the clevises 23 at each side of the machine. From each clevis 23 there runs a short cable 33 connecting with the signal arm cables 5 and 6.

Owing to the offset arrangement of the eyes 20, slightly forward of the rear axle, the arm 22 when in lowermost operative position will assume the position shown in Figure 6, extending straight down and abutting the rear axle housing which provides, in effect, a stop and brace therefor. Other details of the invention comprise guide pulleys 34 for the cables 5 and 6.

Normally the various instrumentalities described are in the full line positions shown in Figure 1, under tension of the springs 24. On contact of the fender bumper 12 with an object in front of the machine, the fender will drop as described, through pull of the springs 24 on cables 32, and in like manner the springs acting on clevises 23 will rock the bell crank levers 21 so that the parts will assume the dotted line position shown in Figure 1 and full line in Figure 6. The lower ends of the sectors 27 will engage under the wheels 18 which in turn will ride up on the rollers 29 clear of the ground to run free, stopping forward progress of the machine. The offset arrangement of the eyes 20 secures a wedging and lifting action of the sectors 27 beneath the wheels. At the same time a pull will be exerted on the cables 33 to throw out both signal arms 3 and 4, indicating stop, to the rear. When the fender 12 is lifted and reengaged in the spring clips 16 the parts will be returned to their normal, inoperative position.

It will thus be seen that I have provided a device which on contact of the fender with an object in front of the machine, automatically lowers the fender, displays a stop signal, and jacks up the rear wheels, effectually arresting forward progress of the machine without any action on part of the operator.

While in this preferred embodiment, certain details entering into the construction and operation of the invention have been illustrated and described, I desire it to be understood that I do not intend to limit myself to these, but that any such modifications may be employed as will fall within the scope of the invention as claimed.

I claim:—

1. A safety device for automobiles, comprising a fender, means for holding said fender, in raised position, means carried on the rear axle of the automobile for jacking up the rear wheels thereof, and spring tension means for lowering said fender and operating said jacking means on forcible contact of the fender with an obstacle.

2. A safety device for automobiles, comprising a normally raised fender, a jack carried by the rear axle housing for elevating the rear wheels, connection between said fender and jack, and means released by the fender for lowering said fender and operating said jack on forcible contact of the fender with an obstacle.

3. A safety device for automobiles, comprising a spring held swinging fender, a rocking lever journalled on the rear axle housing of the automobile, a wedge sector on said lever for engaging under a rear wheel of the automobile to lift same from the ground, connection between said lever and fender for mutual movement, and spring tension means for rocking said lever to engage said wedge beneath the wheel and lower said fender on forcible contact of the fender with an obstacle.

4. In a safety device for automobiles, a collar adapted to be secured on a rear axle housing, an offset eye on said collar, a bell crank lever journalled in said eye, a wedge on one arm of said lever to engage under and lift a rear wheel on rocking of said lever, a spring tension element connected to the other arm of said lever, and a contact operated release disposed forwardly of the automobile for allowing rocking of said lever under action of the spring tension element.

5. In a safety device for automobiles, the combination with an automobile, of a collar secured on the rear axle housing thereof, an offset eye on said collar, a bell crank lever journalled in said eye, a trough shaped sector carried by one arm of said lever to engage under a rear wheel on rocking of said lever, wheel engaging rollers in said sector, the other arm of said lever being adapted to abut the rear axle housing in stopping relation, and contact operated means for rocking said lever to engage said sector under a rear wheel and lift same from the ground.

6. A safety device for automobiles, comprising a fender normally disposed in inoperative position but movable into operative position on striking against an object; braking means; actuating means therefor; a connection extending from the fender to the brake-actuating means and normally holding the latter against operation but releasing it during the movement of the fender into operative position; a stop signal; and an operating element for the signal connected at one end therewith and at the other end with said brake-holding connection.

7. A safety device for automobiles, comprising a fender normally disposed in inoperative position but movable into operative position on striking against an object; braking means; actuating means therefor; a cable extending from the fender to the brake-actuating means and normally holding the latter against operation but releasing it during the movement of the fender into operative position; a stop signal; and a cable for operating said signal leading from the same to the first-named cable, whereby the brake-actuating means will operate the signal cable simultaneously with the braking means.

8. A safety device for automobiles, comprising a swinging fender; means directly engageable with the fender for normally holding it in raised, inoperative position, said fender being automatically disengaged from said holding means on striking against an object; a braking device including an operating lever; a spring connected to said lever and normally tending to actuate the same; and a flexible connection leading from said lever to said fender and tensioned by the movement of the fender from operative to inoperative position so as to hold said spring against action, but enabling the spring to act when the disengagement of the fender takes place.

9. A safety device, according to claim 8, in which the braking device comprises a brake element proper and an operating lever of bell crank type, one arm of such lever being connected to the brake element, and the other arm having connected to it both the actuating spring and the flexible element.

10. A safety device for automobiles, comprising a fender movable between an inoperative and an operative position and normally held in the former; a braking device embodying a brake element proper and a two-armed operating lever, one arm of which is attached to said brake element; an element normally under tension connected to the other arm of said lever to actuate the same; and a flexible element leading from the fender to the second-named lever arm and tensioned by the movement of the fender into inoperative position so as to hold the lever-actuating element against action, but enabling it to act when the fender moves into operative position.

11. A safety device for automobiles, comprising a fender movable between an inoperative and an operative position and normally held in the former; a braking device embodying a brake element proper and a two-armed operating lever, one arm of which is attached to said brake element; an element normally under tension connected to the other arm of said lever to actuate the same; a flexible element leading from the fender to the second-named lever arm and normally tensioned by the movement of the fender into inoperative position so as to hold the lever actuating element against action, but enabling it to act when the fender moves into operative position; a stop signal and a flexible operating connection for the signal leading therefrom to the second-named lever arm to be actuated simultaneously with said lever by the tensioned lever-actuating element.

In testimony whereof I affix my signature.

ANTONIO DAMORE.